Jan. 31, 1967   H. F. WILD ET AL   3,301,302
VEHICLE TIRES
Filed April 2, 1965   2 Sheets-Sheet 1
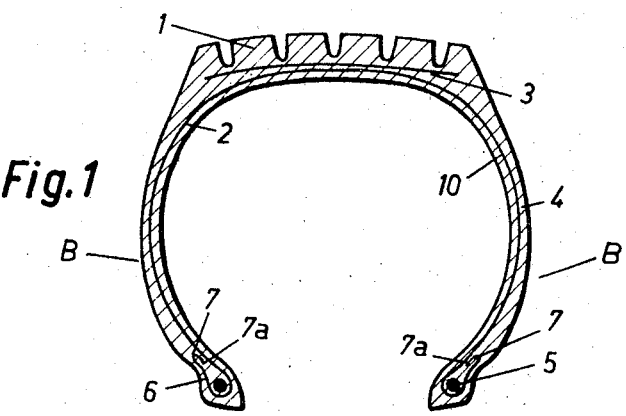
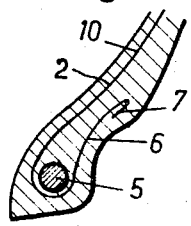
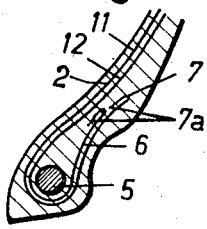
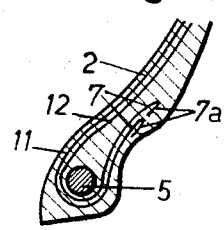
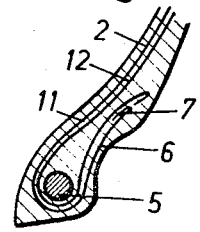
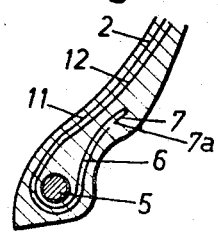
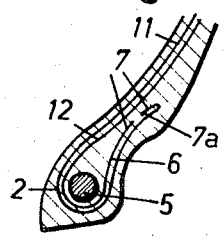
INVENTORS
Hans F. Wild
Harold H. Oelerich
Hellmut R. Hiss
By Cushman, Darby & Cushman
Attorneys

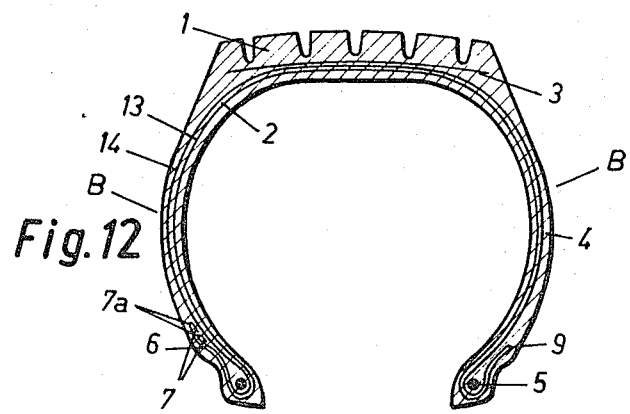
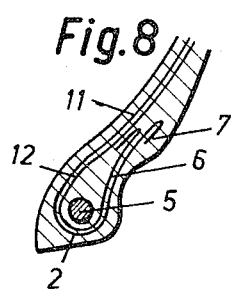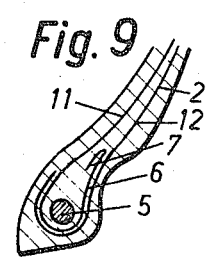
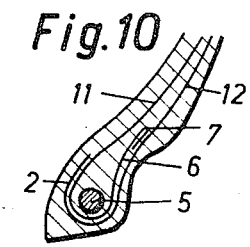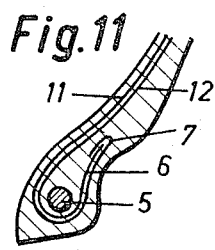

United States Patent Office 3,301,302
Patented Jan. 31, 1967

3,301,302
VEHICLE TIRES
Hans F. Wild, Muttenz, Harald H. Oelerich, Oberwil, and Hellmut R. Hiss, Pratteln, Switzerland, assignors to Fabrik für Firestone Produkte AG., Pratteln, Switzerland, a corporation of Switzerland
Filed Apr. 2, 1965, Ser. No. 445,041
Claims priority, application Switzerland, Apr. 8, 1964, 4,488/64
7 Claims. (Cl. 152—354)

The present invention relates to new and improved constructions of vehicle tires incorporating at least one carcass inlay or layer laid about the bead core or cable.

It has been the tendency in the production of tires to reduce the number of plies or layers of the carcass. Tires have been placed upon the market with two, or, in fact, only a single fabric layer or inlay. Such rubberized fabric layers are generally manufactured such that the fabric is impregnated with an adhesion agent which increases the bond between rubber and fabric, and thereafter, a rubber sheet or plate is fastened at both sides by calendering.

With tires of this type difficulties often-times occur since the durability of the bead is insufficient, because to increase the lateral stability of the tire the layers flexed about the bead cable or core had to be guided up to the so-called bulge or press zone of the tire side walls. With single and double layer tires the fabric layers generally terminate at approximately one-quarter to one-half of the height of the side walls in contrast with the otherwise usual multiple layers which terminate at the height of the bead core and, thus, are disposed outside of the actual bulge or press zone.

As a general rule, the previously mentioned bead damage involves separation, in other words, a breakdown of the adhesion between the fabric and the rubber.

Accordingly, it is a primary object of the present invention to provide an improved tire construction for vehicles and the like which overcomes the aforementioned disadvantages.

A further more specific object of this invention is directed to the construction of an improved tire which effectively prevents and considerably reduces the likelihood of separation between the fiber layer or layers and the rubber.

Generally speaking, the tire designed according to the teachings of the present invention comprises at least one carcass fabric layer which is laid about the cable or core of the bead. According to an important aspect of the invention at least one marginal cut edge of the fabric of the carcass is flexed over. Moreover, the marginal edges of the fabric layer preferably do not extend up to the bulge or press zone of the side walls of the tire.

Other features, objects and advantages of the invention will become apparent by reference to the following detailed description and drawings, wherein like reference characters have been generally employed throughout the various embodiments for substantially the same or analogous elements, and in which:

FIGURE 1 is a cross-sectional view through a tire constructed according to the teachings of the present invention incorporating a single carcass fabric layer;

FIGURE 2 is a fragmentary, cross-sectional view taken through a bead portion of a tire substantially similar to the tire construction of FIGURE 1, yet here showing a single carcass fabric layer with the illustrated end of such layer flexed towards the outside;

FIGURES 3 to 8 are fragmentary, cross-sectional views, similar to FIGURE 2, of a respective bead portion of a tire, each incorporating two carcass fabric layers and showing different possibilities for flexing the ends of such fabric layers;

FIGURES 9 and 10 are respective fragmentary, cross-sectional views of the bead portion of a tire depicting each tire provided with two carcass fabric layers which are flexed about the bead core in opposite directions;

FIGURE 11 is a fragmentary, cross-sectional view of the bead portion of a further embodiment of tire incorporating two carcass fabric layers, both flexed in the same direction about the bead core or cable and wherein the outer layer is flexed over such that it overlies or covers the cut marginal edge of the inner layer; and FIGURE 12 is a cross-sectional view through a tire analogous to the showing of FIGURE 1, yet here employing a carcass with a doubled-fabric layer whereby the layers at one of the bead cores are not cut and are flexed about such bead core, and at the bead core at the other bead portion the cut marginal edges of such layers are flexed or bent over as well as about the associated bead core.

Describing now the drawings, and considering first the exemplary form of tire depicted in FIGURE 1, it will be seen that such contains as usual a tread 1, a carcass 2, a tread ply 3 extending substantially across the region of the tread 1, side walls 4 and a bead cable or core 5 or equivalent structure. The carcass 2 which, in this case, is assumed to comprise a single fabric layer 10 forms a loop portion 6 which is bent and guided about the bead cable or core means 5. It will also be observed that the respective marginal edge zone or border 7 including the associated cut marginal edge 7a of this loop portion 6 is bent at its respective end, as shown. Whereas in the embodiment illustrated in FIGURE 1 each such marginal zone 7 with the cut marginal edge 7a is flexed inwardly in the direction of the bead cable or core 5, in the embodiment of FIGURE 2, depicting the right bead portion of a tire, this marginal zone 7 with its cut marginal edge 7a is flexed outwardly away from such associated bead core 5.

In the different embodiments of tires shown in FIGURES 3 to 8 it will be seen that the carcass 2 in each instance comprises two superimposed fabric layers 11, 12. It should also be appreciated that the illustrated marginal edges or ends 7a of these fabric layers 11, 12, can either both be inwardly flexed as shown in FIGURE 3, can both be flexed towards the outside as shown in FIGURE 4, or one edge of one of the layers, such as layer 11, can be flexed inwardly and the other, namely layer 12, flexed outwardly, as is the case in the tire construction of FIGURE 5. In FIGURES 6 and 7 only the marginal edge 7a of one of the layers of the carcass is flexed, such flexed layer being somewhat longer than that layer which is not flexed. More specifically, in FIGURE 6 it will be seen that the layer 12 is flexed towards the outside whereas the other layer 11 does not have its marginal zone 7 flexed at all. On the other hand, in FIGURE 7 the layer 11 possesses a marginal end or edge 7a which is inwardly flexed whereas the other layer 12 does not have its marginal zone 7 bent over. In the embodiment of FIGURE 8, again showing the carcass 2 having two fabric layers 11, 12, each layer has its cut marginal edge flexed to opposite sides with respect to the other layer.

The tire constructions depicted in FIGURES 9 and 10 are carried out such that one layer 11 of the carcass 2 is trained from the inside towards the outside about the bead core 5 and the other layer 12 from the outside towards the inside about such bead core 5. The inner layer 11 which extends further in the direction towards the so-called bulge or press zone B (FIGURE 1) of the side walls 4 of the tire is flexed over at its marginal zone 7 and, more specifically, towards the inside as shown in the embodiment of FIGURE 9, or else towards the outside as depicted in the embodiment of FIGURE 10. It will also be appreciated that it is equally possible and advantageous if the outer layer 12 has its marginal zone 7 flexed over and covers or overlies the end of the inner layer 11 as such is shown for instance in FIGURE 11. While in the embodiments depicted in FIGURES 2 to 11 only the construction of the right bead portion is shown it will be understood that the left bead portion can possess a similar construction.

It is also to be appreciated that both bead zones or portions of a tire do not have to be similarly constructed. Thus, for instance, in the embodiment depicted in FIGURE 12 the carcass 2 embodying fabric layers 13, 14 at the one side, namely the right side of the tire, is bent about the bead core 5 so that a doubled-fiber layer 13, 14 results which exhibits an interconnecting bending edge 9, however, no cut marginal edge. On the other hand, at the other left bead, both of the fabric layers 13, 14 possess marginal zones 7 having cut marginal edges 7a, each of which are bent or flexed towards the inside.

The reason for the advantageous action of the flexed-over cut marginal edges is that such cut marginal edges can then take-up less moisture. It has been found that the absorption of moisture during the storage time between the cutting of the fabric strips and vulcanisation of the tire is then at a minimum if these fabric strips with flexed-over cut marginal edges are stored between removable separating materials (intermediate layers) in rolled-up condition. The flexed marginal ends or strips possessing a width of about between 1–15 millimeters are thus considerably less exposed to moisture than if the freshly cut edges are freely subjected to the moisture of the air. Additionally, the cut edges are not coated or covered with the usual adhesion agents since cutting of the fabric strip takes place after calendering. For this reason, the cut surface possesses a poorer adhesion to rubber, whereby the difference between the adhesion value of impregnated fabric amounts to approximately threefold that of unimpregnated fabric.

Due to the bending-over or flexing of the marginal zones or regions of the cut marginal edges, there is achieved that the relevant cut marginal edge, which for the previously mentioned reasons has a lower adhesion capability to rubber, does not exactly coincide with the location in the bulge or press zone of the tire where the fabric layer terminates and there results a transition zone. It will also be clearly understood that the same physical structure can be analogously employed with tires having more than two fabric layers.

While there is shown and described present preferred embodiments of the invention it is to be distinctly understood that the invention is not limited thereto but may be otherwise variously embodied and practised within the scope of the following claims.

What is claimed is:

1. A vehicle tire comprising spaced bead cable means, a carcass provided with at least one fabric layer bent about both of said bead cable means, said fabric layer including cut marginal edge means, and means provided for reducing the receipt of moisture by said fabric layer, said means for reducing moisture comprising a marginal portion of said cut marginal edge means which is flexed back upon itself.

2. A vehicle tire according to claim 1 wherein said carcass comprises a double-fabric layer which is bent at one end about said bead cable means.

3. A vehicle tire according to claim 2 wherein said double-fabric layer is cut at its other end to define two fabric layers which are bent about said bead cable means, one of said last-mentioned fabric layers having a flexed marginal edge means and the other of said fabric layers having a non-flexed marginal edge means, said flexed marginal edge means covering said non-flexed marginal edge means.

4. A vehicle tire according to claim 1 wherein said carcass is provided with at least two fabric layers which are bent in opposite directions about said bead cable means.

5. A vehicle tire according to claim 1 wherein said carcass is provided with at least two fabric layers which are bent in the same direction about said bead cable means.

6. A vehicle tire according to claim 1 wherein said moisture reducing means is defined by a flexed portion of said at least one cut marginal edge means, said flexed portion being bent inwardly in the direction of said bead cable means.

7. A vehicle tire according to claim 1 wherein said moisture reducing means is defined by a flexed portion of said at least one cut marginal edge means, said flexed portion being bent outwardly away from said bead cable means.

References Cited by the Examiner
UNITED STATES PATENTS
3,244,215   4/1966   Bridge et al. _____ 152—356

FOREIGN PATENTS
970,772   9/1964   Great Britain.

ARTHUR L. LA POINT, Primary Examiner.

C. W. HAEFELE, Assistant Examiner.